Sept. 2, 1969   R. J. BERNI ET AL   3,464,781
PARTIAL CELLULOSE ETHERS WITH STRONG ANION EXCHANGE PROPERTIES
Filed May 2, 1967
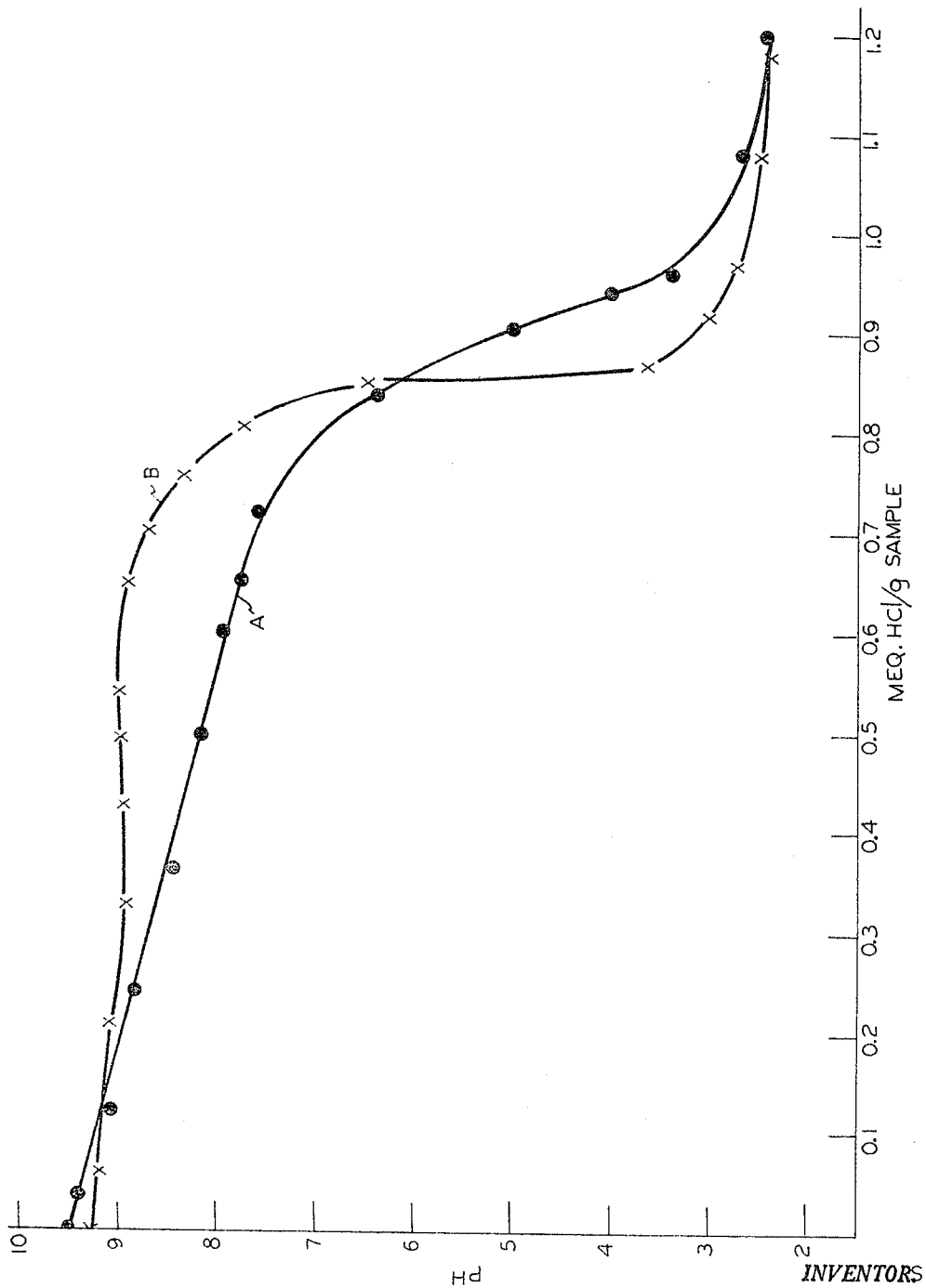
INVENTORS
RALPH J. BERNI
RUTH R. BENERITO
JOHN B. McKELVEY
BY
ATTORNEYS 3,464,781
PARTIAL CELLULOSE ETHERS WITH STRONG
ANION EXCHANGE PROPERTIES
Ralph J. Berni, Ruth R. Benerito, and John B. McKelvey,
New Orleans, La., assignors to the United States of
America as represented by the Secretary of Agriculture
Filed May 2, 1967, Ser. No. 635,986
Int. Cl. D06m 13/34; C08b 11/20
U.S. Cl. 8—116.2                                  3 Claims

ABSTRACT OF THE DISCLOSURE

This invention relates to the production of partial cellulose ethers with strong anion exchange properties and improved crease recovery. More particularly, this invention relates to the reaction of cellulose pretreated with sodium hydroxide solution with the reaction products of epichlorohydrin and triethyl or triethanol amine to produce a cellulose ether with strong anion exchange properties and improved wet and dry crease resistance.

---

A non-exclusive, irrevocable, royalty free license in the invention herein described, throughout the world for all purposes of the United States Government, with the power to grant sublicenses for such purposes, is hereby granted to the Government of the United States of America.

A primary object of the present invention is to provide a method for preparing at will some cellulose ethers with strong anion exchange properties and improved wet and dry crease recovery.

Prior art processes are known for the preparation of strong base anion exchanges to partially convert diethyl-aminoethylated cotton to the quaternary form by refluxing in 10% $CH_3I$ in absolute alcohol. Benerito (Benerito, R. R., Woodward, B. B., and Guthrie, J. D., Anal. Chem., 37, 1693 (1965) found that a large number of tertiary amines could be converted to quaternary groups by using the same method of Hoffpauir and Guthrie (Hoffpauir, C. L., and Guthrie, J. D., Text. Res. J. 20, 617 (1950)). However, it was necessary to treat the fibers under completely anhydrous conditions.

In contrast to prior art processes for the formation of quaternary amino groups on cellulose, this invention produces such a product without the need for maintaining anhydrous conditions which often prove unworkable in normal commercial processes. Also no $CH_3I$ reflux period is necessary since the quaternary groups formed in situ through direct interaction between epichlorohydrin and triethyl or thiethanol amine as shown below:

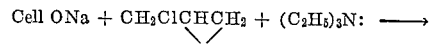 + $(C_2H_5)_3N$: ⟶

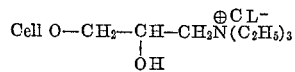

 + $(C_2H_5OH)_3N$: ⟶

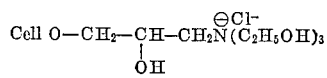

In addition some reaction between the NaOH treated cellulose and epichlorohydrin takes place to improve the wet resiliency of the fabric. The product formed also has increased dry crease recovery and is titrated as a strong base exchanger.

The present invention includes pretreatment of cotton fabric with solutions of NaOH ranging from 8–28% by weight before immersing the rolled fabric into a 3:1 mole ratio solution of epichlorohydrin and triethyl or triethanol amine. The fabric is allowed to react in the epichlorohydrin and triethyl or triethanol amine solution for 1.5 to 24 hours. The fabric is then removed from the reaction vessel and washed with tap water, neutralized in acetic acid and then washed in methanol and again with water. The reacted fabric is then dried and equilibrated.

To determine the ion exchange, an accurately-weighed sample of sufficient weight to give approximately 0.8 meq. of replaceable anion was placed in a titration flask containing exactly 50.00 ml. of a salt solution prepared with conductivity water and kept in a nitrogen atmosphere. The sample was allowed to equilibrate overnight in the titration flask while being stirred with nitrogen gas bubbled first into a bubbler containing the given solution before being bubbled into the titration flask to minimize concentration changes in the flask. All potentiometric titrations were carried out in specially designed cells of approximately 250 ml. capacity having four ground glass outlets to accommadate the microburet in the center, and inlet-outlet tube for nitrogen, the glass electrode, and the saturated calomel electrode. All pH measurements were made with a Beckman Model G–S pH meter to ±0.05 pH unit. Each titration required from 8–12 hours because the time required in some instances for establishment of equilibrium. FIGURE I illustrates the curves of strong (A) and weak (B) ion exchange cotton.

Example 1

Approximately 10.0 of 48″ x 72″ cotton fabric (desized, scoured, and bleached) was twice padded to 100% pickup with 28% NaOH and then immersed in a graduate cylinder containing 60 ml. of epichlorohydrin (0.75 mole) and 35 ml. of triethanolamine (0.25 mole). After 19 hours reaction time, the fabric was removed from the recation medium and neutralized with acetic acid and tap water. The fabric was then rinsed three times in methanol, quenched in tap water and finally with distilled water. The fabric was then ironed dry and allowed to equilibrate for 16 hours before weighing. The treated fiber had a weight add-on of 12.6%, a nitrogen content of 0.52%, a dry or conditioned crease recovery value of 236 and 285° (W+F) respectively. The treated fabric was then ground in a Wiley Mill and titrated as a strong base anion exchange resin.

Example 2

A 68″ x 72″ fabric was treated as in Example 1 with two exceptions. Triethylamine was used instead of triethanol amine in the reaction with epichlorohydrin and secondly, the reaction time was decreased from 19 hours to 4 hours. The treated fabric had a weight add-on of 9.5%, a nitrogen content of 0.20%, a dry or conditioned crease recovery value of 238° (W+F) and a wet crease recovery value of 242° (W+F). The fabric was then titrated as a strong base anion exchange resin.

Example 3

The following properties were obtained using a procedure as in Example 2.

| Sample No. | Percent NaOH pre-treatment | Reaction time (hrs.) | Percent add-on | Percent N | Dry (W+F) | Wet (W+F) |
|---|---|---|---|---|---|---|
| 1 | 8 | 7.5 | 15.0 | 0.51 | 246 | 252 |
| 2 | 8 | 16.2 | 20.0 | 0.59 | 257 | 226 |
| 3 | 23 | 0.5 | 2.9 | Trace | 206 | 237 |
| 4 | 23 | 1.9 | 6.9 | 0.14 | 182 | 257 |
| 5 | 23 | 4.5 | 16.8 | 0.34 | 154 | 308 |

All but sample three showed strong anion exchange properties.

We claim:

1. A process for producing a partial cellulose ether in fabric form, comprising
   (a) padding a cotton fabric to a 100% pickup with an aqueous solution of sodium hydroxide having a concentration of at least 8% by weight;
   (b) reacting the thus-padded cotton fabric with a 3:1 mole ratio solution of epichlorohydrin and a member selected from the group consisting of triethyl amine and triethanol amine for at least .5 hour at room temperature;
   (c) washing the reacted fabric free of reagents, ironing it dry, and allowing it to equilibrate for 16 hours.

2. The process of claim 1 wherein the member is triethyl amine.

3. The process of claim 1 wherein the member is triethanol amine.

References Cited
UNITED STATES PATENTS

| | | | |
|---|---|---|---|
| 3,351,420 | 11/1967 | McKelvey et al. | 8—116.2 |
| 3,243,426 | 3/1966 | Caesar | 260—233.3 |
| 3,102,112 | 8/1963 | Carter et al. | 260—212 |
| 2,876,217 | 3/1959 | Paschall | 260—233.3 |
| 2,710,861 | 6/1955 | Charles et al. | 260—212 |
| 2,664,360 | 12/1953 | Charles et al. | 106—123 |

DONALD E. CZAJA, Primary Examiner

R. W. GRIFFIN, Assistant Examiner

U.S. Cl. X.R.

260—231